US009613472B2

(12) United States Patent
Heine et al.

(10) Patent No.: US 9,613,472 B2
(45) Date of Patent: Apr. 4, 2017

(54) SYSTEM AND METHOD FOR DATA COLLECTION AND MESSAGING

(75) Inventors: Gary Herbert Heine, Redondo Beach, CA (US); David Tsai, Huntington Beach, CA (US); Bruce Andrew Mutter, Fullerton, CA (US); Thomas Fallow Trisdale, Corona, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 1308 days.

(21) Appl. No.: 12/562,859

(22) Filed: Sep. 18, 2009

(65) Prior Publication Data

US 2011/0071724 A1 Mar. 24, 2011

(51) Int. Cl.

| | |
|---|---|
| ***G06F 19/00*** | (2011.01) |
| ***G06F 7/00*** | (2006.01) |
| ***G06F 11/00*** | (2006.01) |
| ***G01M 17/00*** | (2006.01) |
| ***G07C 5/00*** | (2006.01) |
| ***G07C 5/08*** | (2006.01) |

(52) U.S. Cl.
CPC .......... *G07C 5/0808* (2013.01); *G07C 5/008* (2013.01); *G07C 2205/02* (2013.01)

(58) Field of Classification Search
USPC .... 701/32, 2, 36, 29, 207, 213, 208, 30, 33, 701/29.1, 29.6, 32.3, 32.4; 455/414.1; 707/6, 104.1
See application file for complete search history.

(56) References Cited

U.S. PATENT DOCUMENTS

| | | | | |
|---|---|---|---|---|
| 5,884,202 | A | 3/1999 | Arjomand | |
| 6,055,468 | A | 4/2000 | Kaman et al. | |
| 6,141,608 | A | 10/2000 | Rother | |
| 6,636,790 | B1 | 10/2003 | Lightner et al. | |
| 7,269,482 | B1 | 9/2007 | Shultz et al. | |
| 7,373,226 | B1 | 5/2008 | Cancilla et al. | |
| 2006/0142907 | A1 | 6/2006 | Cancilla et al. | |
| 2007/0055420 | A1 | 3/2007 | Krzystofczyk et al. | |
| 2008/0294690 | A1* | 11/2008 | McClellan et al. | 707/104.1 |
| 2008/0319665 | A1* | 12/2008 | Berkobin et al. | 701/213 |
| 2009/0023425 | A1* | 1/2009 | Hosain et al. | 455/412.1 |
| 2009/0112393 | A1* | 4/2009 | Maten et al. | 701/30 |
| 2009/0119657 | A1* | 5/2009 | Link, II | 717/171 |
| 2009/0177336 | A1* | 7/2009 | McClellan et al. | 701/2 |
| 2009/0275311 | A1* | 11/2009 | Gilmartin et al. | 455/414.1 |
| 2009/0276115 | A1* | 11/2009 | Chen | 701/32 |
| 2009/0286504 | A1* | 11/2009 | Krasner et al. | 455/404.1 |

* cited by examiner

*Primary Examiner* — Ronnie Mancho

(74) *Attorney, Agent, or Firm* — Andrews Kurth Kenyon LLP

(57) ABSTRACT

A system for diagnosing vehicle problems that may include a client device and central device. The client device may include a connector to connect to a vehicle and a vehicle interface to send and receive information from the vehicle. The client may also include an input/output system, a processor, and a communication system to communicate with the central device. The client device may capture a vehicle identification number (VIN) and may transmit the captured VIN along with geographic information to the central device. In response to received instructions from the central device, the client device may passively capture diagnostic information from the vehicle and transmit the diagnostic information to the central device. In response to the diagnostic information, the central device may transmit further instructions to the client device.

32 Claims, 14 Drawing Sheets

100

200

300

Case 1: Connect to Vehicle

Case 2: Initial Health Check

Case 3: User Initiated Health Check

Case 4: Optional Initial Health Check

Case 5: ECU Reprogram

Case 6: System DTC

Case 7: CUW Update

Case 8: Halt Messaging

Case 9: Market Monitor Messaging

Case 10: Customer Friendly Health Check

SYSTEM AND METHOD FOR DATA COLLECTION AND MESSAGING

BACKGROUND

The present invention relates to vehicle repair service and vehicle diagnostics. As modern vehicles become more sophisticated, vehicle repairs have also become more sophisticated and expensive. Generally, a repair technician will try to diagnose and fix a vehicle problem according to his/her own experience and the large volume of published technical resources available to him/her. Often, the technician will be challenged to find the appropriate information or will attempt the repair based solely on his/her personal experience. This method may lead to inconsistent or inaccurate diagnosis and repair of vehicle problems.

Similar vehicles may develop similar customer concerns. However, the root cause of these concerns may not be discovered in time to be included in published technical resources or the technician may consider these concerns so typical that he/she does not consult the published information. Furthermore, the volume of available published information may make it difficult for the technician to use, search and/or interpret this information. Locating and using the most appropriate information is essential to a swift and accurate diagnosis of vehicle problems. It is also desirable for a vehicle manufacturer to receive information about customer concerns and vehicle repairs to help identify product issues and take proactive measures.

Therefore, there is a need for an improved vehicle diagnostic system to increase the technician's efficiency in the repair and diagnosis process. Also, there is a need for a vehicle diagnostic system that tracks vehicle repairs and instructs the repair technician on how to operate in the best manner accordingly. Furthermore, there is a need for a vehicle diagnostic system that automates relevant diagnostic information gathering by the vehicle manufacturer.

DETAILED DESCRIPTION

Embodiments of the present system provide a system for diagnosing vehicle problems that may include a client device and a central device. The client device may include a connector to connect to a vehicle and a vehicle interface to send and receive information to and from the vehicle. The client may also include an input/output system, a processor, and a communication system to communicate with the central device. The client device may capture a vehicle identification number (VIN) and may transmit the captured VIN along with geographic information to the central device. In response to received instructions from the central device, the client device may passively capture diagnostic information from the vehicle and transmit the diagnostic information to the central device. In response to the received diagnostic information, the central device may transmit further instructions to the client device.

Figure 1:
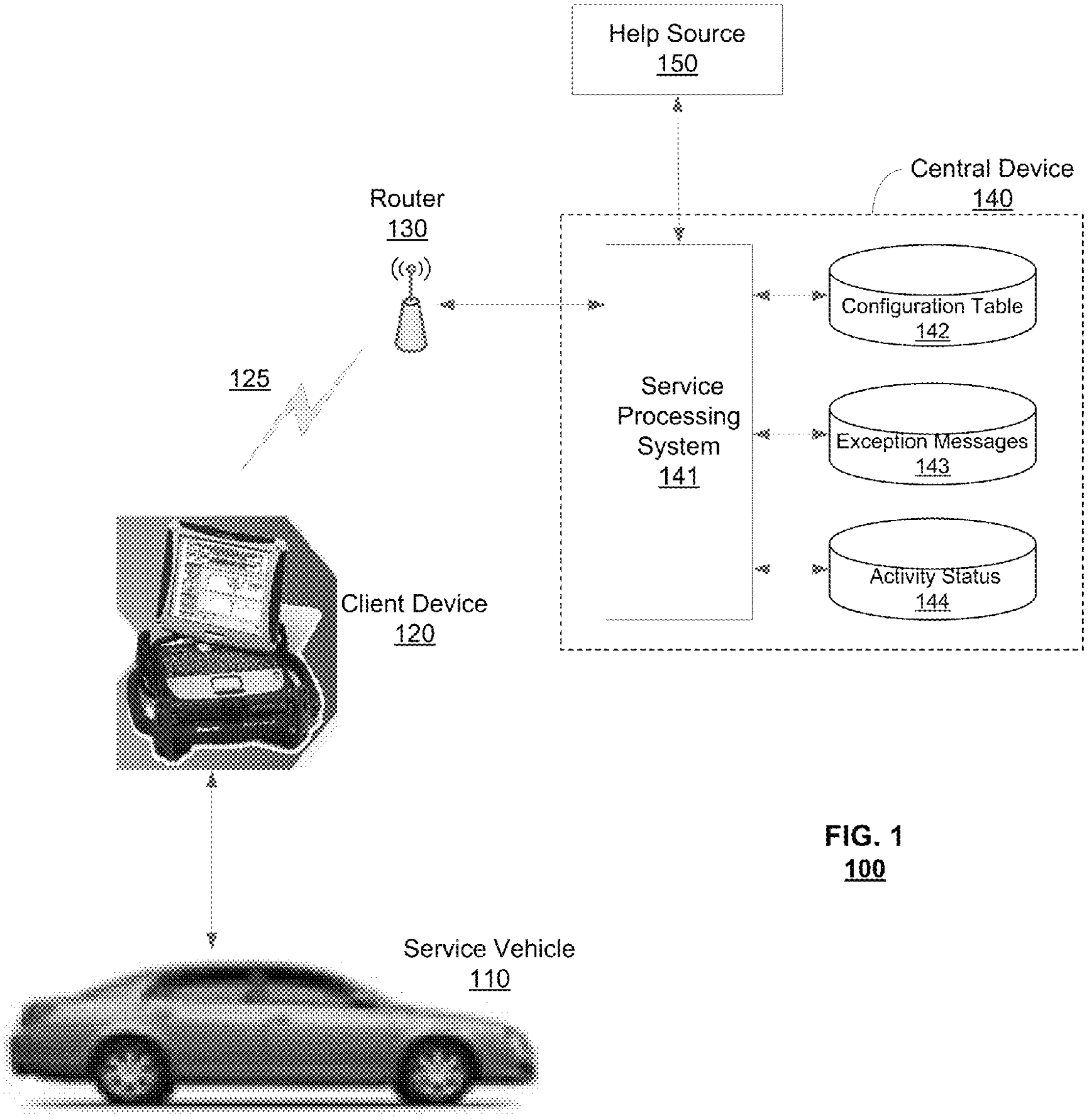
FIG. 1 illustrates an embodiment of a vehicle diagnostic system according to the present invention.

An embodiment of a vehicle diagnostic system 100 according to the present invention can be seen in FIG. 1. The vehicle diagnostic system may include a client device 120 that is connectable to a service vehicle 110. The client device 120 may be communicatively connected to router 130 through wireless link 125. In this embodiment, router 130 is a wireless local area network (WLAN) router; however, any suitable wireless communication system such as WPAN, Bluetooth, cellular network, etc. may be used in the vehicle diagnostic system 100. Alternatively, a wired connection may be used in place of the wireless link 125.

The router 130 may be communicatively connected to a central device 140 thereby communicatively connecting the client device 120 and the central device 140. The central device may be an information processing system. According to an embodiment, the central device 140 may include service processing system 141, a configuration table database 142, an exceptions messages database 143, and an activity status database 144.

The vehicle diagnostic system 100 may further include a help source 150 that is communicatively connected to the central device 150 via a wired or wireless connection. The help source 150 may be an expert technician or a computerized help system that has full access to central device data. A technician at service vehicle 110 may communicate with the help source 150 if needed.

Figure 2:
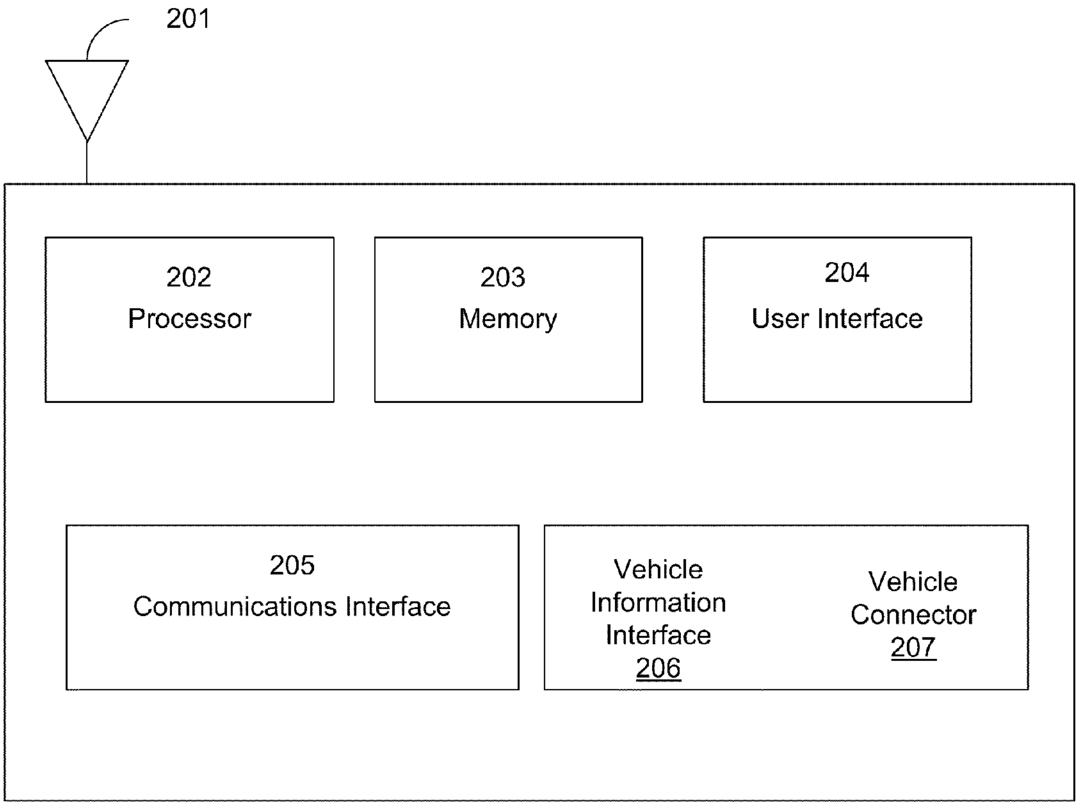
FIG. 2 illustrates an embodiment of a client device according to the present invention.

FIG. 2 is an embodiment of a client device 200 according to the present invention. The client device 200 may include a processor 202 to control the operations of the client device 200. The processor 202 may be any of a plurality of conventional processing systems, including microprocessors, digital signal processors, and field programmable logic arrays. The client device 200 may include a memory 203 to store program instructions as well as other data, for example, vehicle data. Memory 203 may include any combination of conventional memory circuits, including, electrical, magnetic, or optical memory systems. For example, memory 203 may include read only memories, random access memories, and bulk storage.

The client device 200 may also include a user interface 204 to interact with a user such as a technician. The user interface 204 may include a display screen and input device. The display screen may be, for example, an LCD screen, a CRT, a plasma screen, an LED screen or the like. The input device may be a keyboard, a mouse, touch screen sensors or any other user input device that would allow a user to interact with the client device 200.

The client device may also include a communications interface 205. The communications interface 205 allows the client device to transmit and receive messages with coupled antenna 201. The communications interface may be a wireless internet interface, cellular network interface, Bluetooth interface, or any suitable wireless communications interface. Alternatively, communication interface 205 may be a wired communication interface.

The client device may further include a vehicle information interface 207 and a vehicle connector 207 to connect to a service vehicle. The vehicle connector 207 may be a plug in device or a physical pin device, for example, a data link connector. The vehicle connector 207 may also be a device that is clamped or bolted onto a service vehicle, such as a wheel alignment measurement tool. The vehicle information interface 206 may be any suitable interface that can interact with the service vehicle's internal computer system. The vehicle information interface may 206 may also include a sensor to detect whether a service vehicle is connected to the client device or not. The client device may be any electronic device that can gather information from the service vehicle and can transmit the gathered information to the central device. For example, the client device may be a battery inspection tool or vehicle alignment tool that has communication capabilities.

Figure 3:
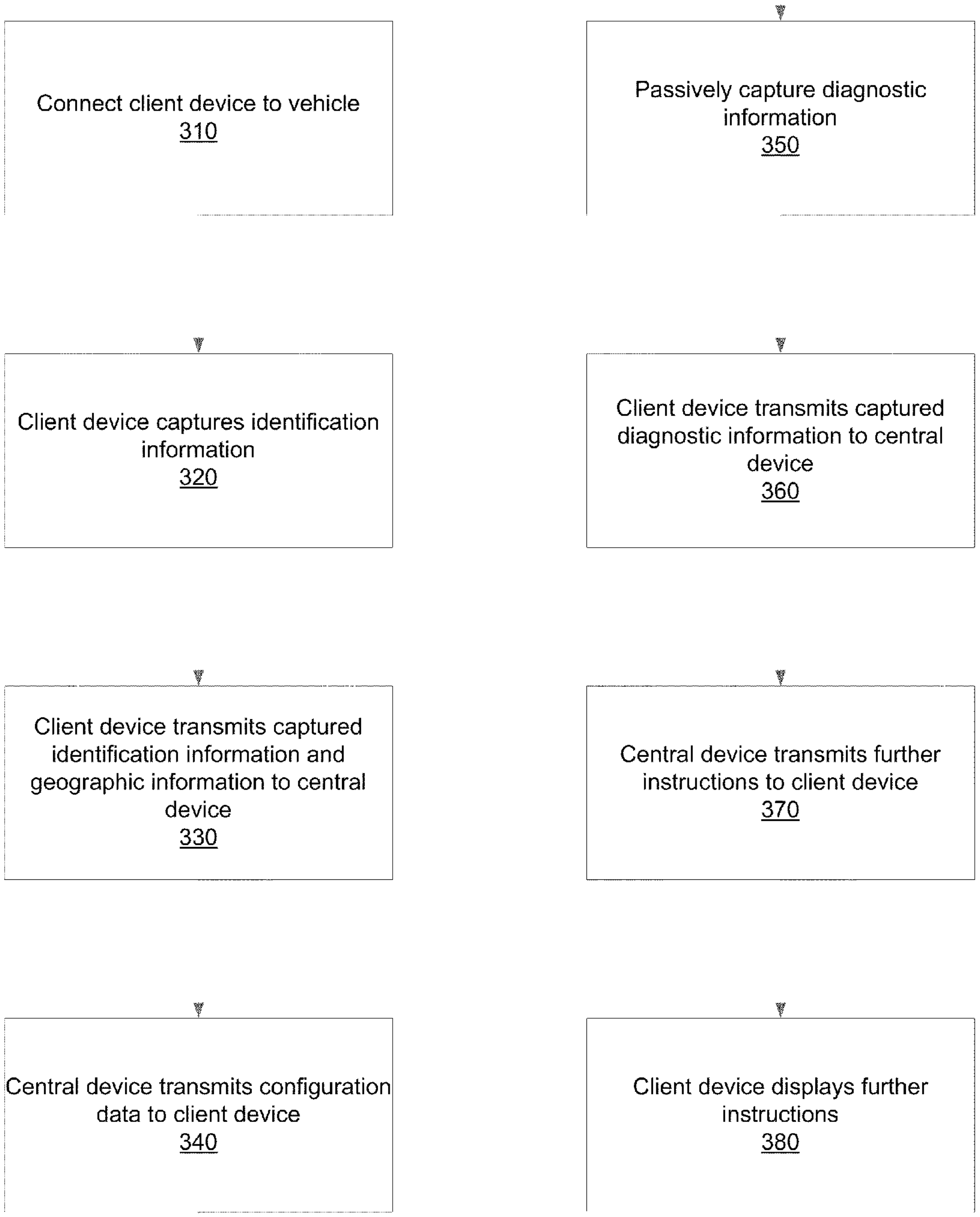
FIG. 3 illustrates an example use of the vehicle diagnostic system according to the present invention.

FIG. 3 illustrates a method 300 for vehicle diagnostics according to an embodiment of the present invention. Method 300 may include connecting the client device to the vehicle (Block 310). A technician may connect the client device to the service vehicle at the repair shop. Once client device is connected to the vehicle, the client device may detect the connection. Method 300 may further include the client device capturing identification information from the vehicle (Block 320). The identification information may include such things as the vehicle identification number (VIN).

The client device may then transmit the captured identification information along with other information such as the geographic location to the central device (Block 330). Responsive to the transmitted message from the client device, the central device may compile configuration data corresponding to the vehicle (Block 340). The configuration data may include instructions for the client device that cause the client device to passively collect diagnostic information from the vehicle. The central device may transmit the configuration data to the client device.

Responsive to the instructions in the received configuration data, the client device may passively collect diagnostic information from the service vehicle (Block 350). In passively collecting diagnostic information, the client device may automatically collect the diagnostic information from the service vehicle without any further action taken by the technician. The client device may then transmit the captured diagnostic information to the central device (Block 360). The transmission may be done automatically by the client device without any action taken by the technician.

The central device may further instruct the client device to passively collect data that is unrelated to the repair at hand for quality investigative purposes from the service vehicle. The central device may do so in order to investigate and recognize possible product trends. By passively collecting such data directly from the service vehicles via the client device, the central device insures that the data is uncontaminated by other sources such as technician personal biases or opinions. The passive collection of the data allows the central device to directly collect the data at one location instead of having the data scattered in multiple locations. The collected data may then be used to identify patterns and act accordingly.

Moreover, the central device may instruct the client device to passively collect data for warranty claim or coverage purposes. By the client device passively collecting the data, central device may validate the proper warranty claims and recognize improper warranty claims. For example, a warranty claim may cite a particular fault code in the service vehicle, but the passively collected data may show another fault code for that service vehicle. The inconsistency may be detected by the central device because of the passively collected data. Therefore, passive collection of the data facilitates warranty claim procedures.

The central device then may compile further instructions based on the received diagnostic information (Block 370). The further instructions may include various objects such as directions for the client device to gather more diagnostic information, directions for the technician to perform a specific operation, directions for the technician to contact a particular person, or directions to access data on a provided hyperlink, etc. The client device may display the received further instructions (Block 380). If the further instructions include contacting another person such as a help source, the information in the central device pertaining to the service vehicle may be available to the help source. For example, the help source may have access to the activity status database 144.

Method 300 provides an efficient framework for vehicle diagnostics. Identification information is quickly captured and transmitted to the central device along with geographic information. Also, passively capturing diagnostic information saves time and resources.

Figure 4:
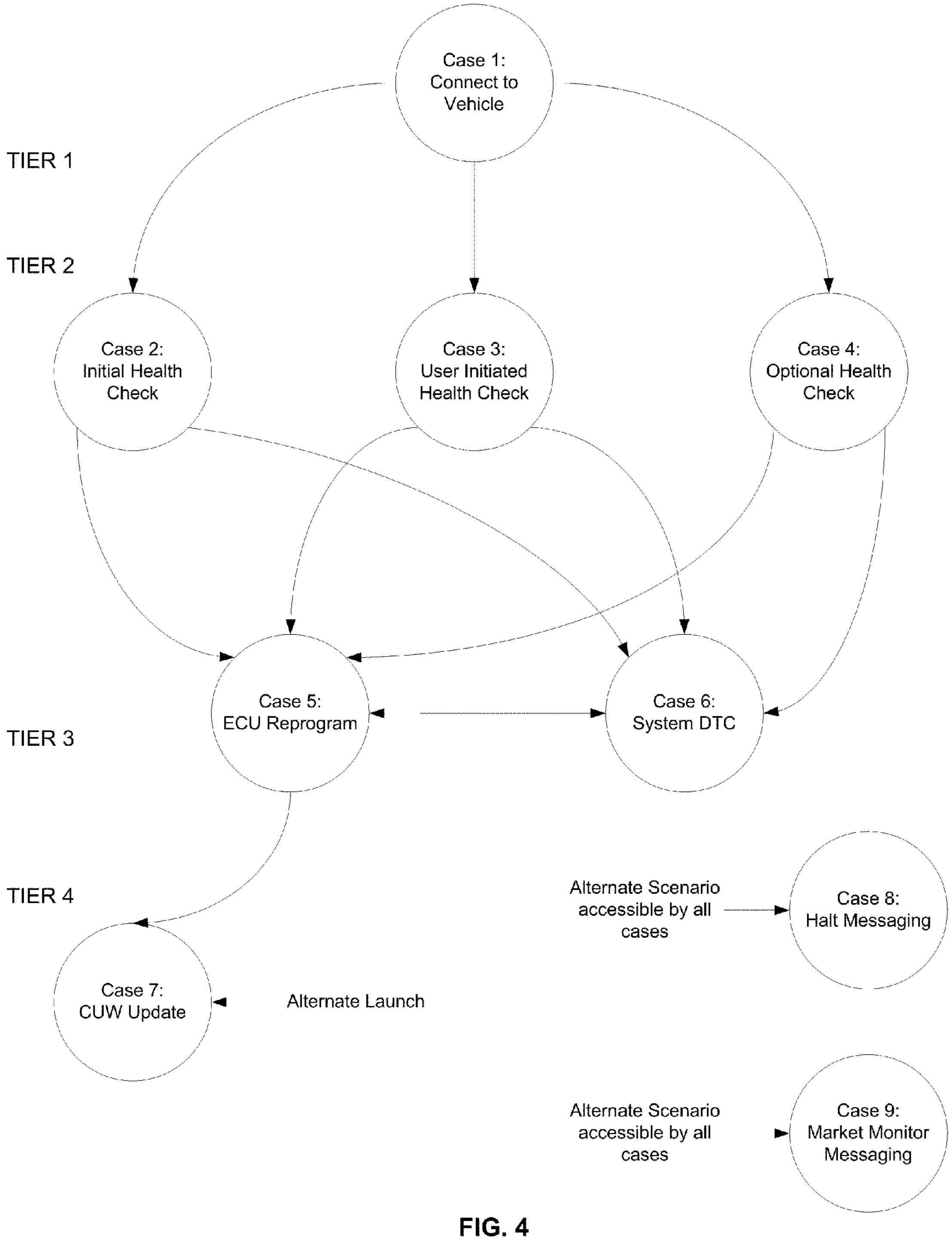
FIG. 4 illustrates a relationship chart of case scenario embodiments according to the present invention.

Method 300 is a broad depiction of a vehicle diagnostic operation according to an embodiment of the present invention. Referring to FIG. 4, a more detailed method is provided according to embodiments of the present invention. In this method, a variety of operations, or cases, are provided covering vehicle diagnostics. In FIG. 4, these cases are provided in four tiers. Tier 1 may include Case 1 (Connect to Vehicle), which is a precondition for all Tier 2 case scenarios. Tier 2 may include Case 2 (Initial Health Check), Case 3 (User Initiated Health Check), and Case 4 (Optional Health Check). Tier 3 case scenarios may be accessed from any Tier 2 case scenarios. Tier 3 may include Case 5 (ECU Reprogram) and Case 6 (System DTC). Case 5 and Case 6 may also be accessed from each other. Tier 4 may include Case 7 (CUW update), which is accessible from Case 5. Case 7 may also be accessed by an alternate launch scenario. Case 8 (Halt Messaging) and Case 9 (Market Monitor Messaging) are alternate scenarios that may be accessed from any case scenario. The different scenarios of FIG. 4 are described further in detail herein.

Case 1: Connect to Vehicle

Figure 5:
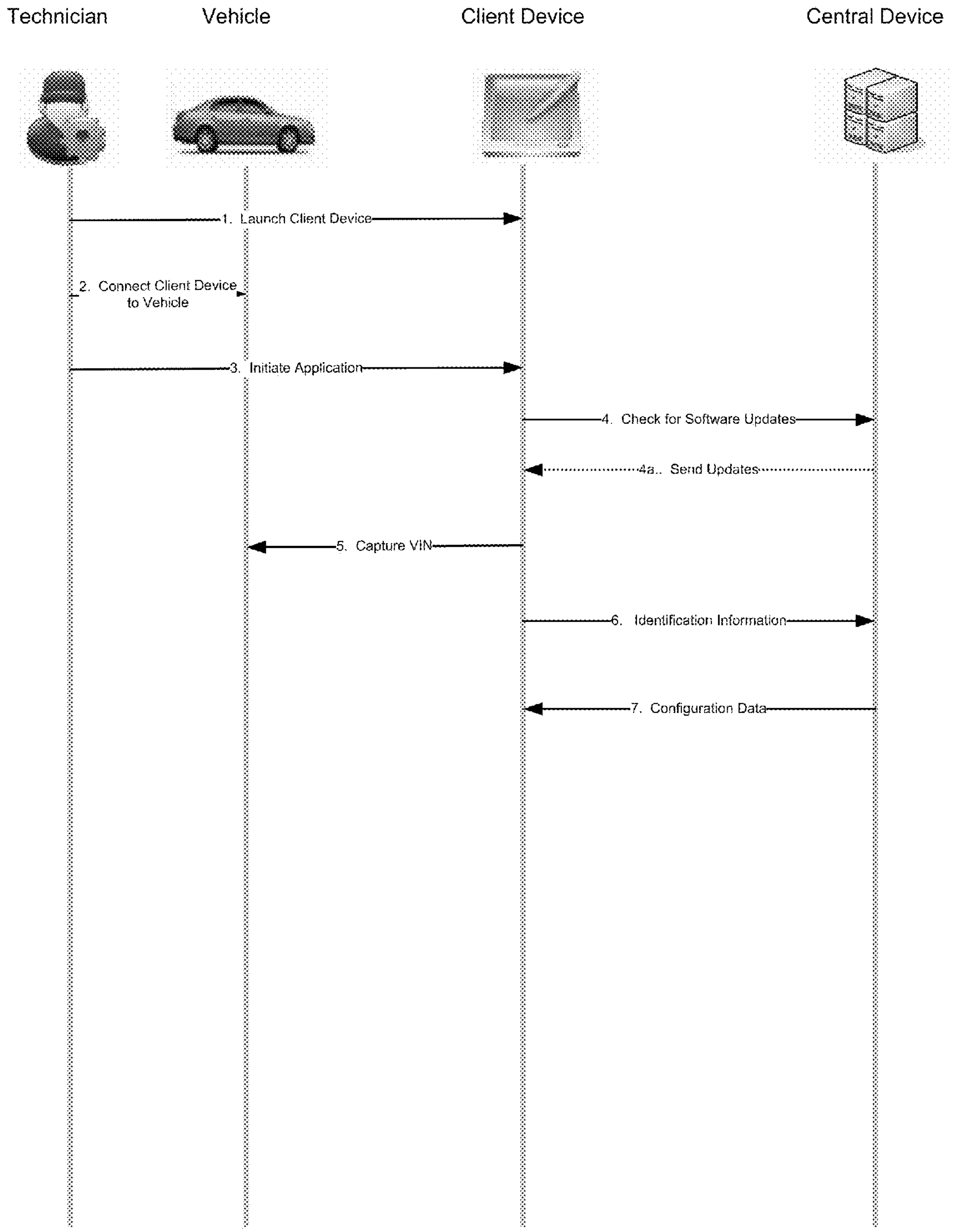
FIG. 5 illustrates a case scenario embodiment of connecting to a vehicle.

FIG. 5 illustrates a case scenario of connecting the client device to the service vehicle and initiating communications with the central device. In step 1, the technician may launch the client device application on the client device. In step 2, the technician may connect the client device to the service vehicle (e.g. as described above). In step 3, the technician may initiate the client device application by, for example, clicking a "Connect to Vehicle" icon on the client device display. In step 4, the client device may connect to the central device and check for any software updates that have become available since the last application use.

If there are updates available, the central device may transmit the updates to the client device for implementation in step 4*a*. The update may be performed via a pop-up screen at the client device. If the update is required, a critical pop-up screen may notify the technician that a new software version is available and an update is required. If the update is optional, a warning pop-up screen may notify the technician that a new software version is available and an update is optional. The software update sequence insures that the client device is operating on the most recent software version.

Next, in step 5, the client device may retrieve VIN from the service vehicle. In step 6, the client device may transmit the VIN and other identification information such as the geographic location to the central device. In step 7, the central device may transmit configuration data to the client device.

Case 2: Initial Health Check

Figure 6:
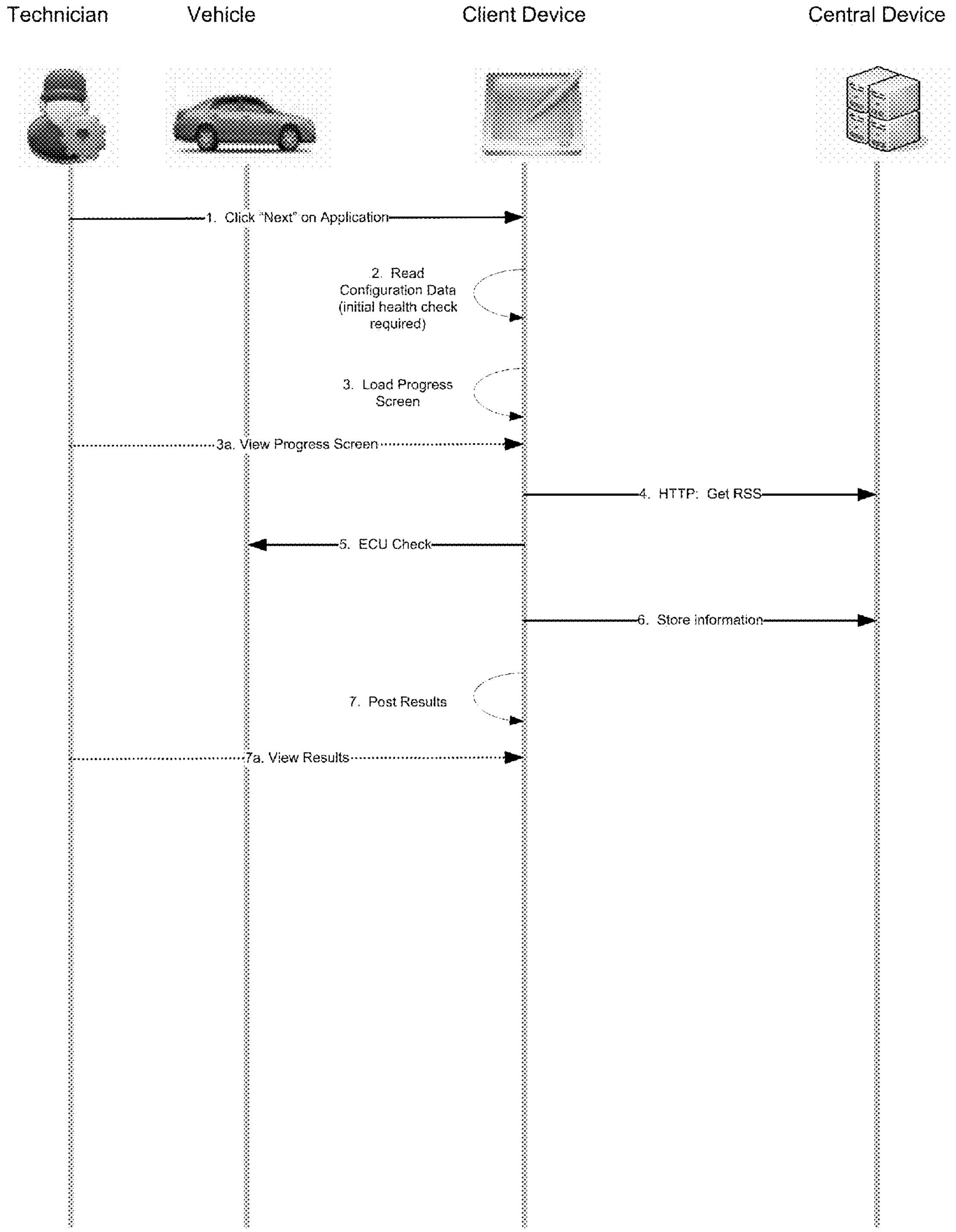
FIG. 6 illustrates a case scenario embodiment of an initial health check.

FIG. 6 illustrates a case scenario of performing a full initial health check on the service vehicle. An initial health check inspects the service vehicle before any operation is performed thus capturing relevant information before the state of the service vehicle is changed. In step 1, the technician may select the next step in the client device application. In step 2, the client device may read the configuration data it received from the central device relating to initial health check requirements. If the configuration data requires an initial health check, the client device may load a progress screen on the client device in step 3. Correspondingly, the technician may view the progress screen on the client device in step 3*a*, and the technician may make changes via the client device. A status bar may be shown to indicate the progress screen of the readings. Next in step 4, the client device may make a HTTP call to receive an RSS feed from the central device, in which the central device may transmit additional relevant information about possible areas of interest to the client device for the technician to note.

In step 5, the client device may begin the health check responsive to the received configuration data by actively collecting information from the service vehicle. The configuration data may identify which systems to check and what level of data should be captured in the electronic control unit (ECU). For example, the configuration data may indicate to check the Powertrain ECU, Chassis ECU, and Body ECU. The configuration data may also indicate to capture other information such as software identification, relevant controller version numbers, and fault codes. After all data has been captured by the client device, the client device may make a web service call to the central device to store relevant information relating to the service vehicle captured information in step 6. The client device may also post the results on the client device display for the technician to view the results as shown in steps 7 and step 7*a*.

Case 3: User Initiated Health Check

Figure 7:
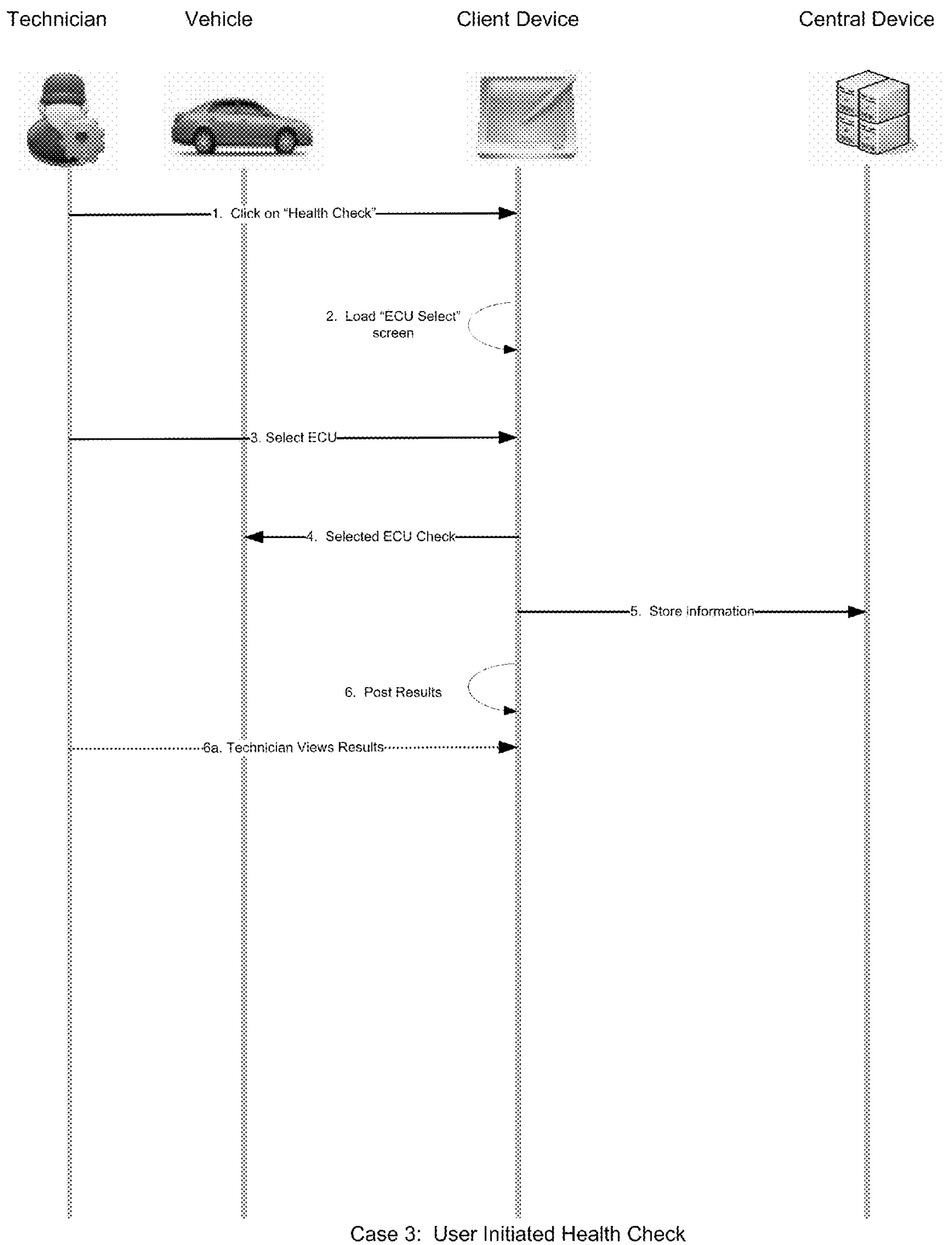
FIG. 7 illustrates a case scenario embodiment of a user initiated health check.

FIG. 7 illustrates a case scenario of performing a user initiated health check on the service vehicle. In step 1, the technician may select the "Health Check" option on client device application. In step 2, the client device, responsive to the technician selection, may load "ECU Select" screen on the client device display. In step 3, the technician may select ECU's from the display screen. Responsive to the selection, the client device may check the selected ECU in the service vehicle in step 4. After checking the selected ECU, the client device may make a service call to the central device to store relevant information such as Calibration ID's, DTC's, VIN, Vehicle Connect Session ID, and selected ECU in step 5. The client device at this time may also check the central device for calibration updates and product information updates. The product information updates may originate from a manufacture initiated customer satisfaction program or a government initiated product repair program. In step 6, the client device may post the results of the "Health Check" on the client device display for the technician to view the results as shown in steps 6 and 6*a*.

Case 4: Optional Health Check

Figure 8:
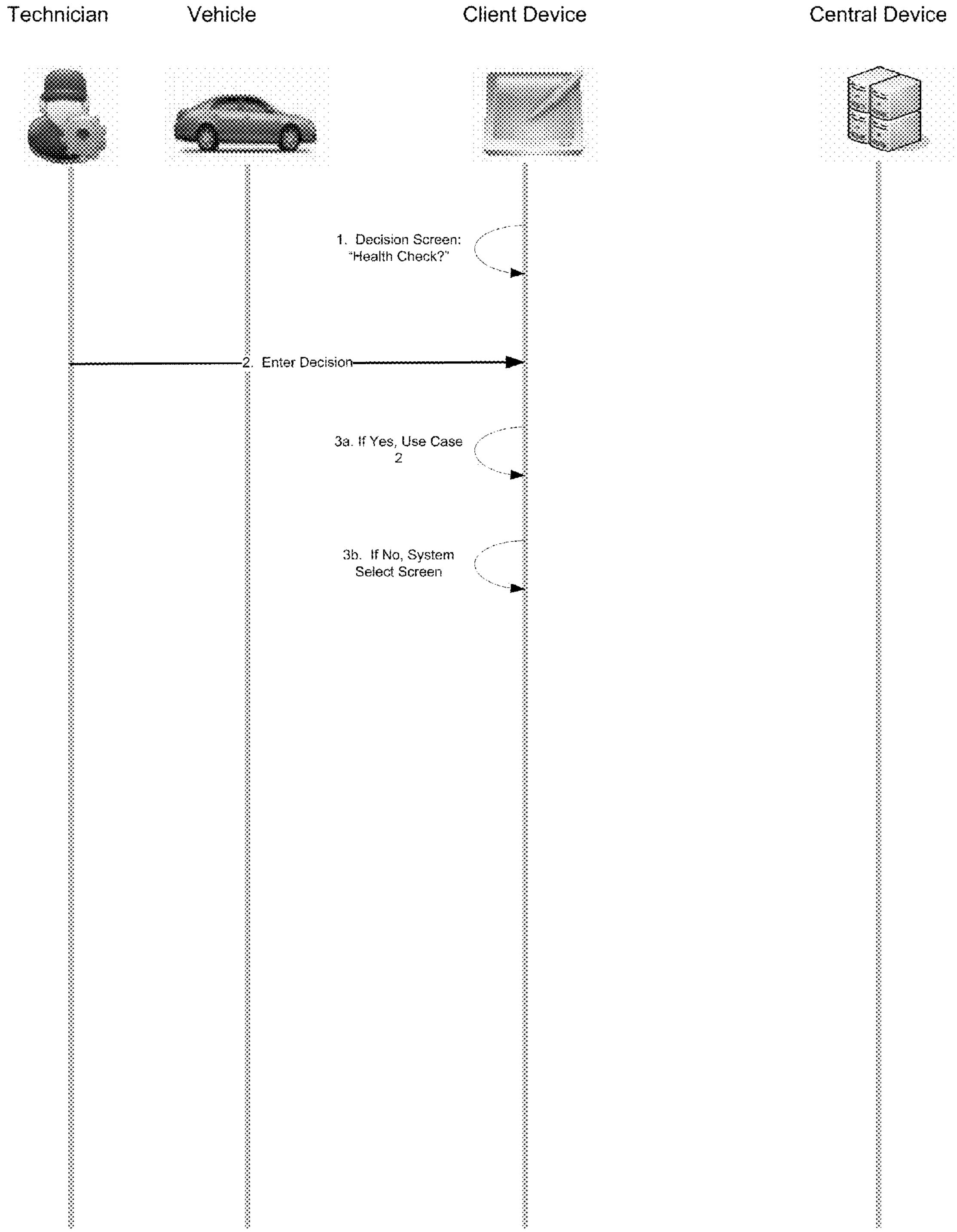
FIG. 8 illustrates a case scenario embodiment of an optional initial health check.

FIG. 8 illustrates a case scenario of performing an optional initial health check on the service vehicle. In step 1, the client device may display a prompt decision screen. For example, the decision screen may read "Would you like to perform a Health Check?" Next, the technician may enter an answer in the client device in step 2. If the answer is Yes, then the client device may run Case 2 Initial Health Check procedure in step 3*a*. If the answer is No, the client device may turn to a System Select Screen in step 3*b*. Optional Health Check scenario allows the technician to initiate a health check when a health check may not be due or required, which leads to better maintenance service and preemptive vehicle care.

Case 5: ECU Reprogram

Figure 9:
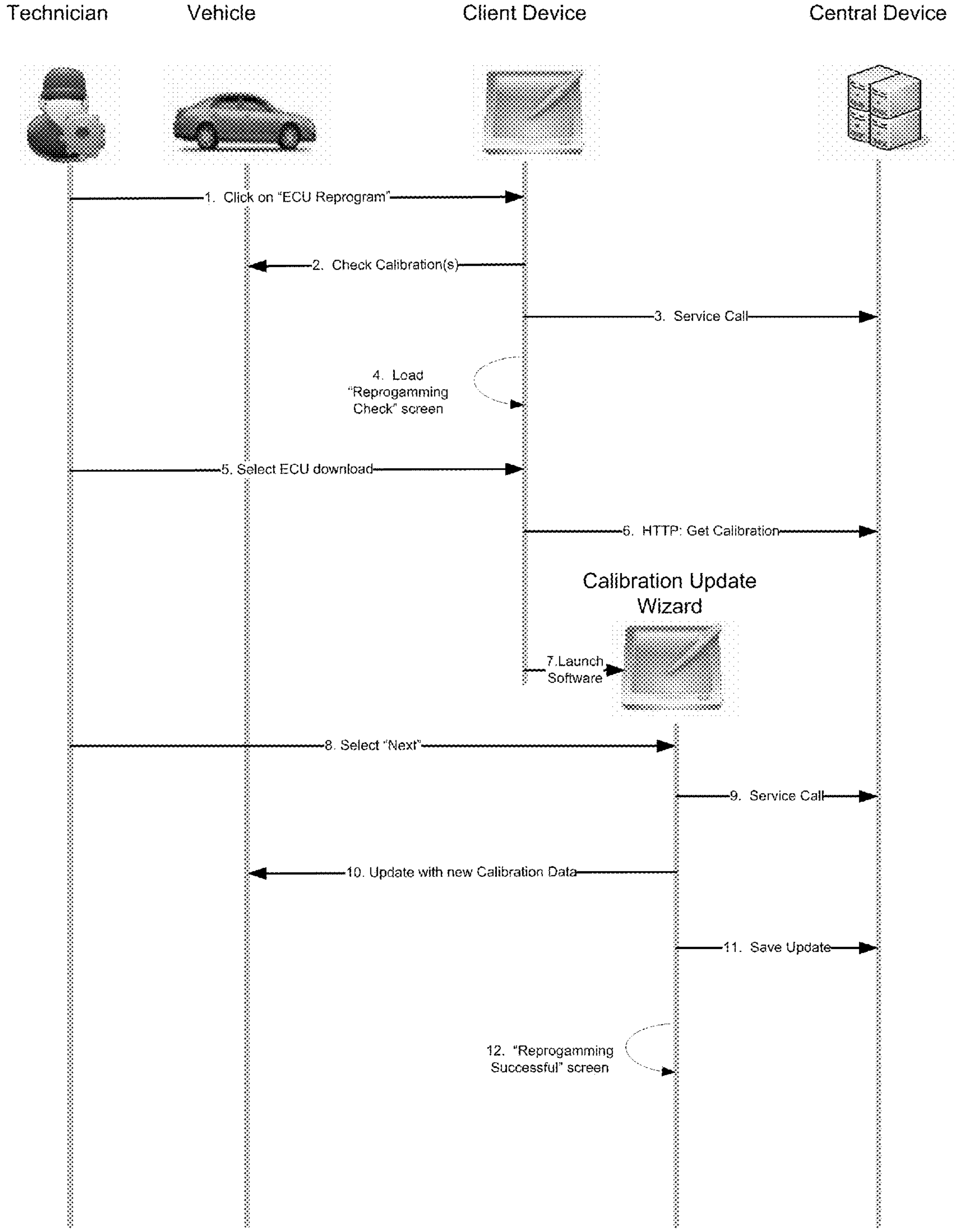
FIG. 9 illustrates a case scenario embodiment of an electronic control unit reprogram.

FIG. 9 illustrates a case scenario of performing an ECU Reprogram on the service vehicle. In step 1, the technician may select the "ECU Reprogram" option on the client device's "System Select" screen. In response, the client device may check the service vehicle's ECU for calibration(s) in step 2. In step 3, the client device may make a service call to the central device with Calibration ID's and Vehicle Connect Session ID for calibration ID update(s). In step 4, the client device may load a "Reprogramming Check" screen. In step 5, the technician may select the calibration(s) to update. In step 6, the client device may make a web service call to the central device to download the calibration updates.

Once the download is initiated, the client device launches the Calibration Update Wizard software in step 7. The Calibration Update Wizard software may be installed on the client device and may have the capability to communicate with client device software settings. In step 8, the technician may select the option on the client device display to proceed. Next the client device may make web service call to the central device to check for calibration again in step 9. The central device may return pre-flash messages, that would then be presented on the client device display. The pre-flash messages may be caution/instructional messages for the technician to take or refrain from a particular action. For example, a pre-flash message may instruct the technician to check that a particular part is in place before the calibration begins. The pre-flash messages may be directed to hardware as well as software. In step 10, the Calibration Update Wizard updates the service vehicle with new calibration data. In step 11, the Calibration Update Wizard makes a web service call with the Calibration ID, new Calibration ID, successful update flag, and the Vehicle Connect Session ID. After the successful update, the client device may also display a successful update message screen in step 12. In the case of an existing pre-flash message, the successful update message may be an item in an array. The central device may also passively collect data relating to the successful calibration update to store for its records.

Case 6: System Diagnostic Trouble Codes (DTC)

Figure 10:
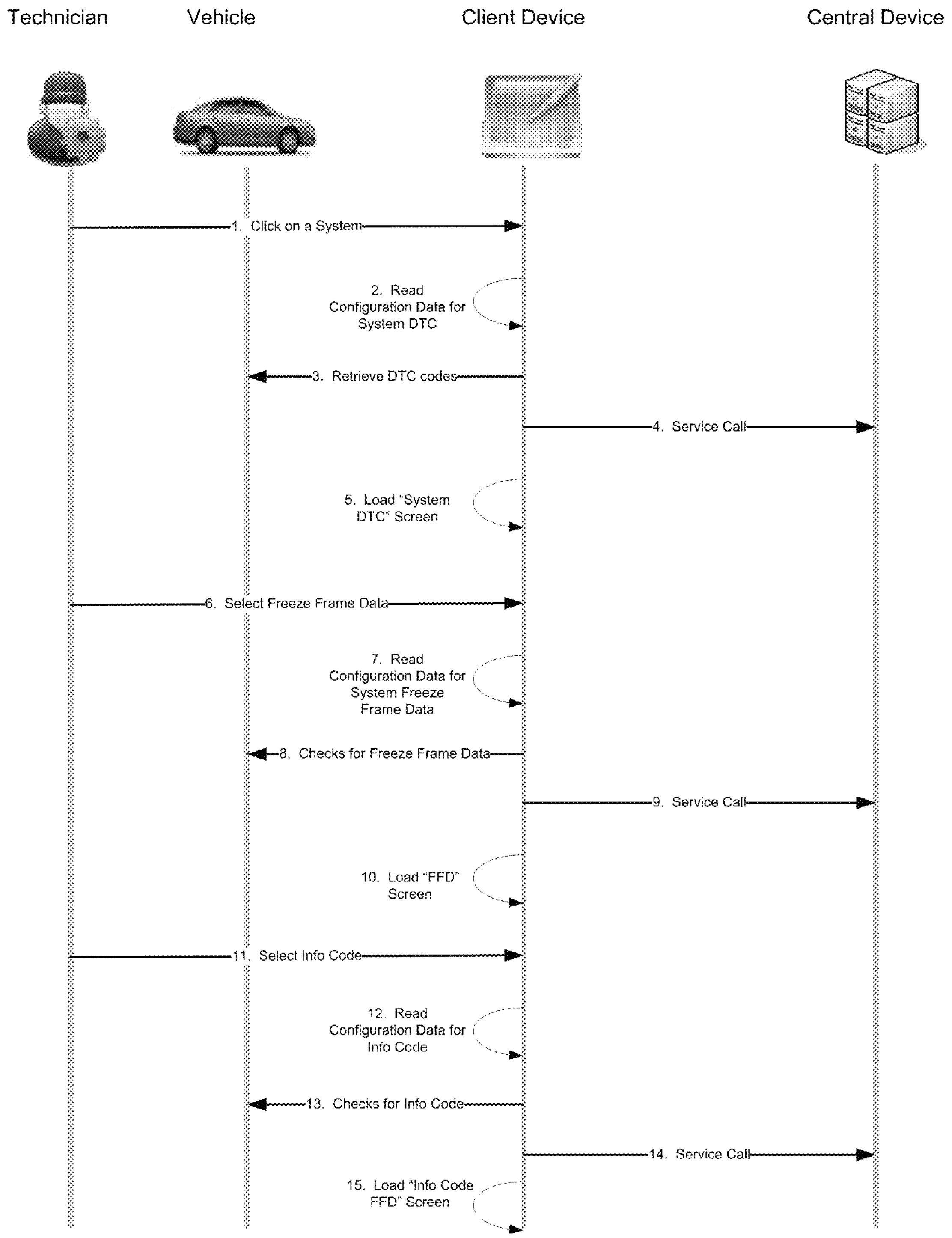
FIG. 10 illustrates a case scenario embodiment of a diagnostic trouble code system.

FIG. 10 illustrates a case scenario of performing a system DTC check on the service vehicle. In step 1, the technician may select an ECU from the "System Select" screen on the client device application. In step 2, the client device may read the configuration data it received from the central device pertaining to system DTC. In step 3, the client device may passively check the service vehicle for selected DTC's and retrieve the selected DTC's without any further action taken by the technician. In step 4, the client device may make a web service call to the central device where the DTC's are read from the service vehicle ECU. The client device may also send other relevant information such as the Vehicle Connect Session ID, Activity Status, Primary DTC, and Second DTC to the central device.

In step 5, the client device may load a "System DTC" screen to present to the technician. In response, the technician may select view Freeze Frame Data from the screen in step 6. Freeze frame data is the captured data from right before and at the moment of the DTC release. Accordingly, the freeze frame data allows the system to focus on the service vehicle's condition at the time of the DTC release, which is advantageous in diagnosing the problem. In step 7, the client device may read the configuration data pertaining to system freeze frame data. In step 8, the client device, responsive to the configuration data, may passively check the service vehicle for the selected freeze frame data. In step 9, the client device may make a web service call to the central device where the DTC's are read from the service vehicle ECU. The client device may also send the Vehicle Connect Session Id, Activity Status, Primary DTC, Second DTC, and Freeze Frame Data to the central device.

In step 10, the client device may load a "System Freeze Frame Data" screen to present to the technician. In response, the technician may select an option to view information code on a specific ECU controller on the "System DTC" screen in step 11. In step 12, the client device may read the configuration data pertaining to system information code of freeze frame data. In step 13, the client device, responsive to the configuration data, may passively check the service vehicle for the Info Code and Freeze Frame Data. In step 14, the client device may make a web service call to the central device where the DTC's are read from the service vehicle ECU. The client device may also send the Vehicle Connect Session Id, Activity Status, Primary DTC, Second DTC, and Freeze Frame Data to the central device. In step 15, the client device may load a "System Info Code Freeze Frame Data" screen. This case scenario illustrates the efficient use of the client device to determine diagnostic problems with the service vehicle and retrieve solutions for the diagnostic problems from the central device.

Case 7: CUW Update

Figure 11:
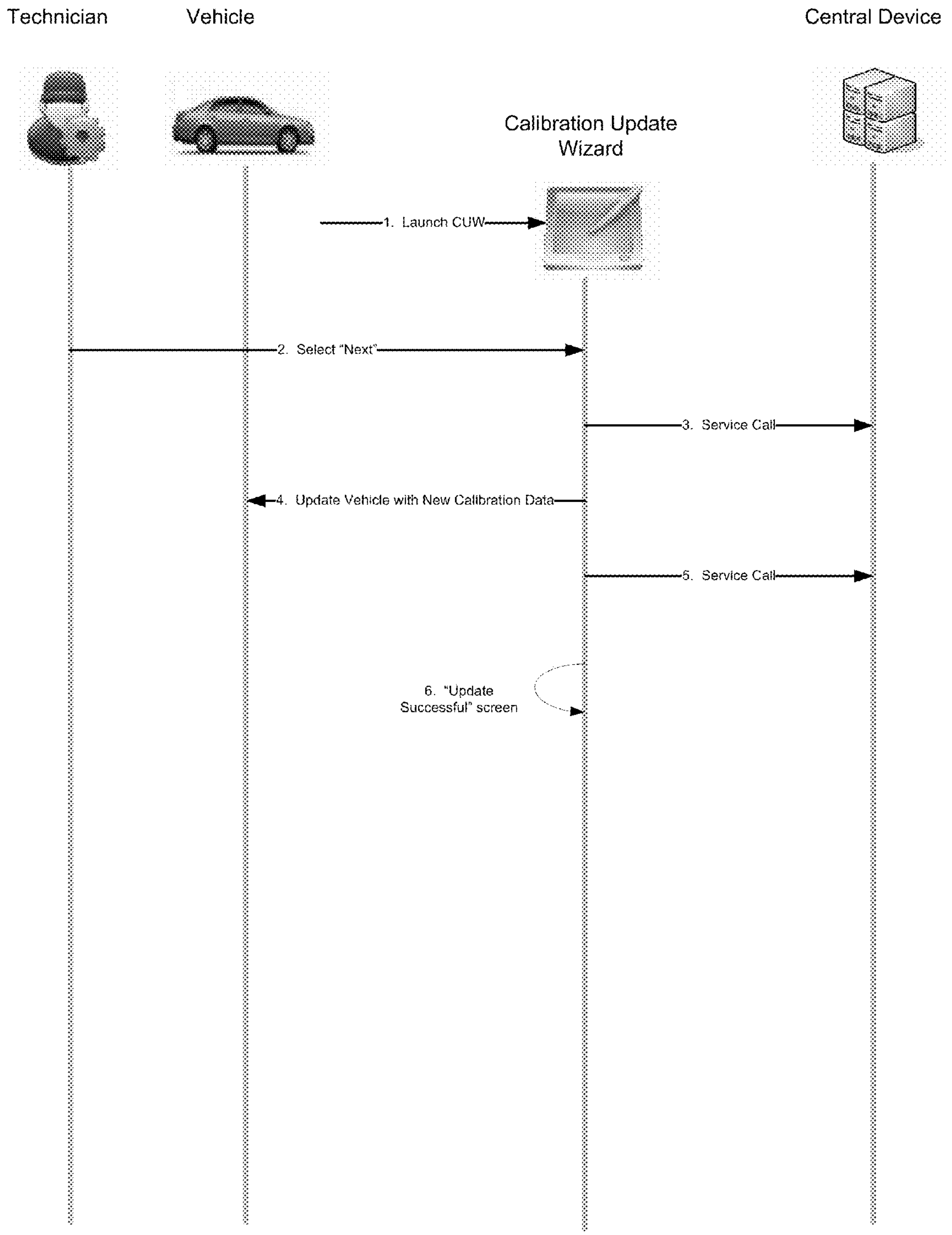
FIG. 11 illustrates a case scenario embodiment of a calibration update wizard.

FIG. 11 illustrates a case scenario of performing a calibration update on the service vehicle. In step 1, the Calibration Update Wizard (CUW) may be launched. CUW may be launched by the technician selecting CUW software. CUW may also be launched by the technician logging onto the central device, searching for a specific calibration, and launching CUW from therein. Once CUW is launched, the technician may select a "Next" option to proceed in step 2. In step 3, the CUW may make a web service call to the central device to check for calibration. The central device may return pre-flash messages, that would then be presented on the client device screen.

In step 4, the calibration update wizard updates the service vehicle with new calibration data. In step 5, the calibration update wizard makes a web service call with the Calibration ID, new Calibration ID, and successful update flag. After the successful update, the client device may also display a successful update message screen in step 6. In the case of an existing pre-flash message, the successful update message may be an item in an array. The CUW insures that the service vehicle is equipped with the latest calibration updates for accurate diagnostic readings.

Case 8: Halt Messaging

Figure 12:
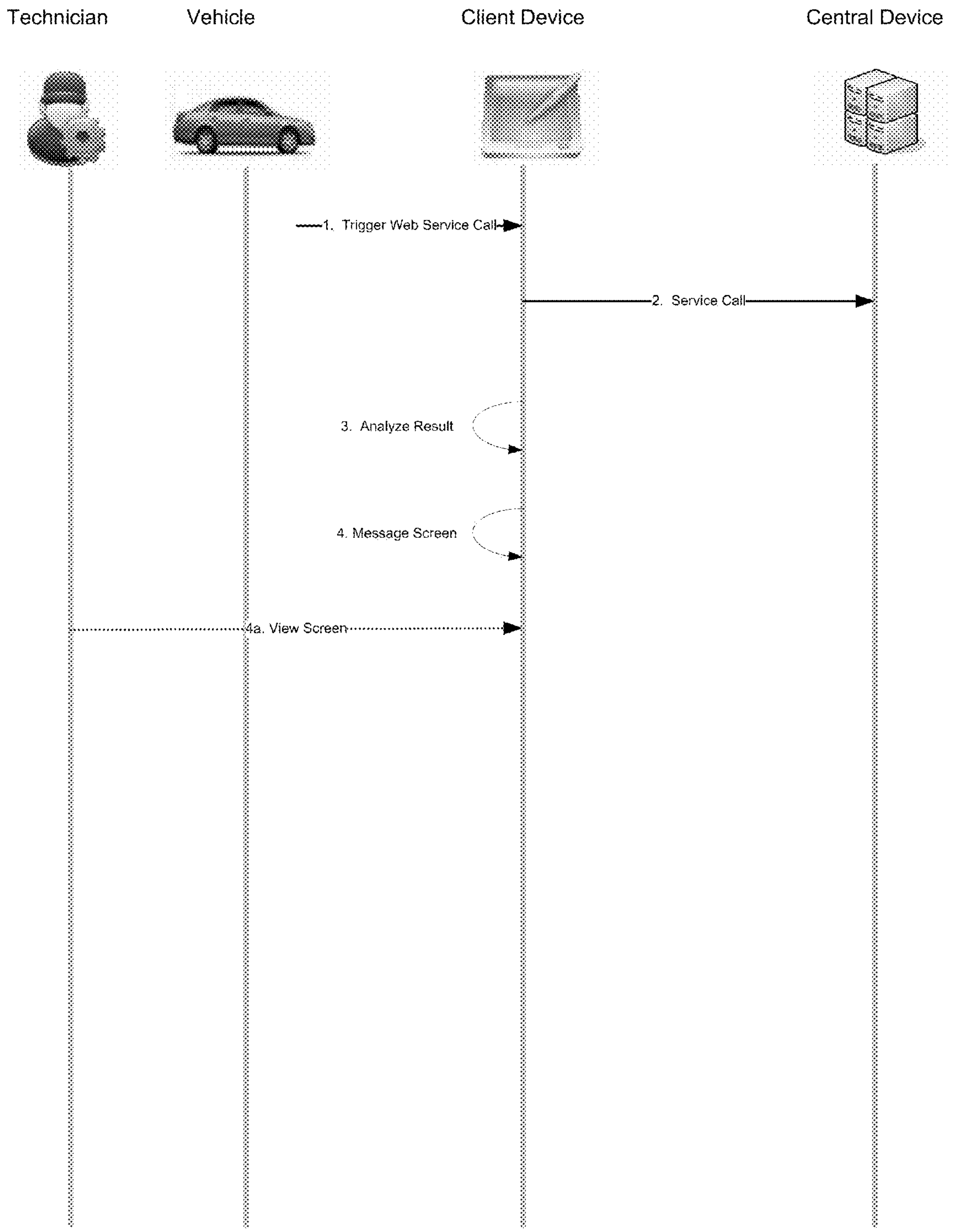
FIG. 12 illustrates a case scenario embodiment of halt messaging.

FIG. 12 illustrates a case scenario of halt messaging. This scenario shows an intercept messaging feature from the central device to the client device. The purpose of halt messaging is to notify the technician with critical messages based on information about the connected service vehicle. Such detections are intended to prevent ill-advised repairs on the service vehicle; therefore, a halt messaging case scenario may occur at any time a service vehicle is connected to a client device including in the middle of any other case scenarios.

In step 1, the client device may be triggered to make a web service call. A trigger, for example, may be to store DTC information as in Case 2 step 6. In response to the web service call, the central device may return messages based on a rule set by the central device administrators in step 2. The client device may analyze the messages received in step 3. In steps 4 and 4*a*, the client device may present a message screen to the technician alerting the technician of a critical situation. For example, the message screen may state "Repair procedures of P4567 are being updated. Contact technical support for special instructions."

Case 9: Market Monitor Messaging

Figure 13:
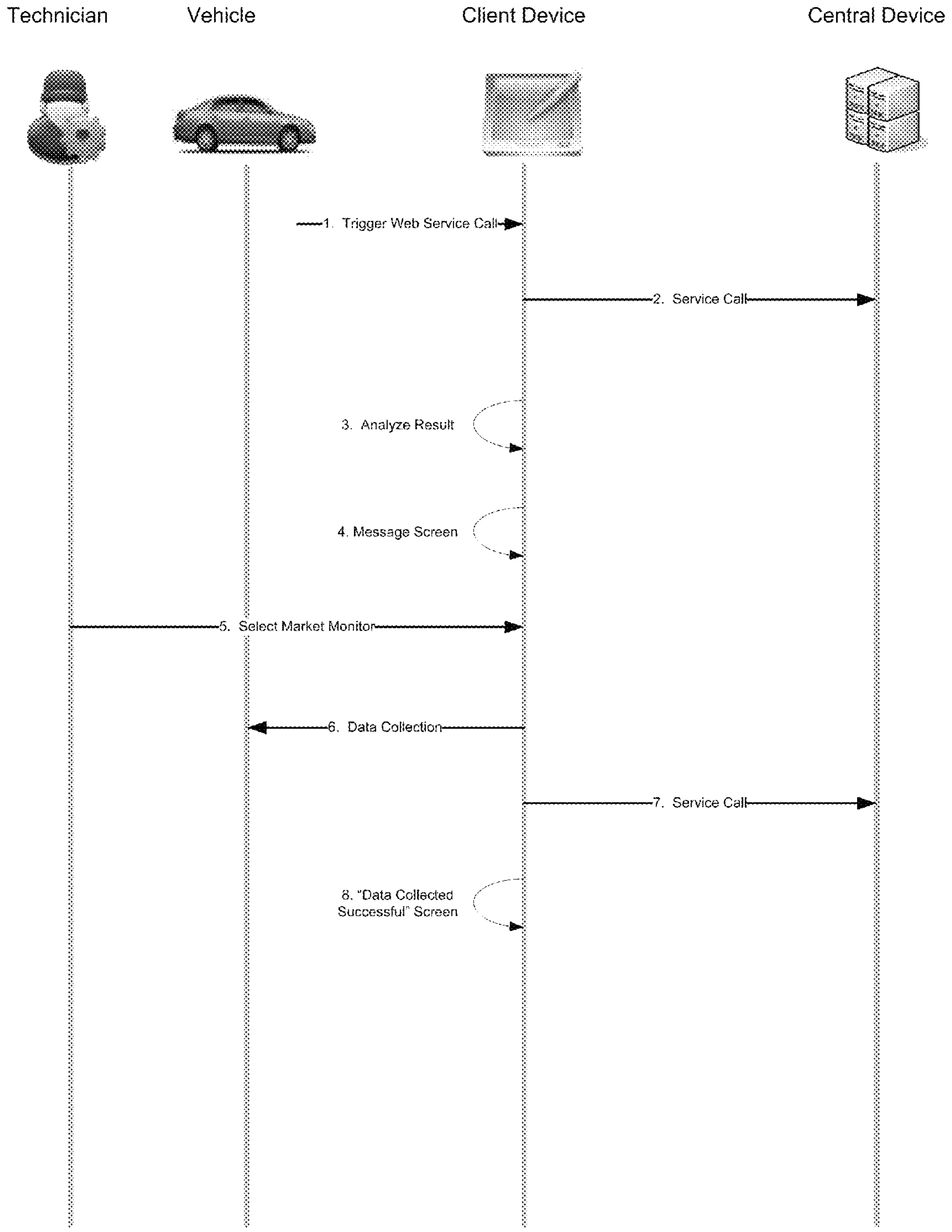
FIG. 13 illustrates a case scenario embodiment of market monitor messaging.

FIG. 13 illustrates a case scenario of market monitor messaging. Market monitor information refers to particular information stored in low-level address registers of components. This scenario shows an intercept messaging feature from the central device to the client device. The purpose of market monitor messaging is to notify the technician with warning and critical messages based on information about the connected service vehicle. Market monitor messaging case scenario may occur at any time a service vehicle is connected to a client device including in the middle of any other case scenarios.

In step 1, the client device may be triggered to make a web service call. A trigger, for example, may be to transmit identification information as in Case 1 step 6. In response to the web service call, the central device may return messages based on a rule set by the central device administrators in step 2. The client device may analyze the messages received in step 3. In steps 4, the client device may present a market monitor progress screen. For example, the message screen may state "Engineering Data Collection Required. This process might take up to 5-10 minutes. A warranty code is displayed upon completion in order to compensate the technician for the process time. Press OK to continue or CANCEL to bypass." In step 5, the technician may select the market monitor option.

In response to the technician selection, the client device may conduct market monitor data collection in step 6. In step 7, the client device may make a web service call to report the data collected. In step 8, the client device may display a data collection completion screen. For example, the message screen may state "Data collection complete. You are now authorized to file a single claim for this vehicle using OpCode xx123 for 0.2 hours."

Case 10: Customer Friendly Health Check (not Shown in FIG. 4)

Figure 14:
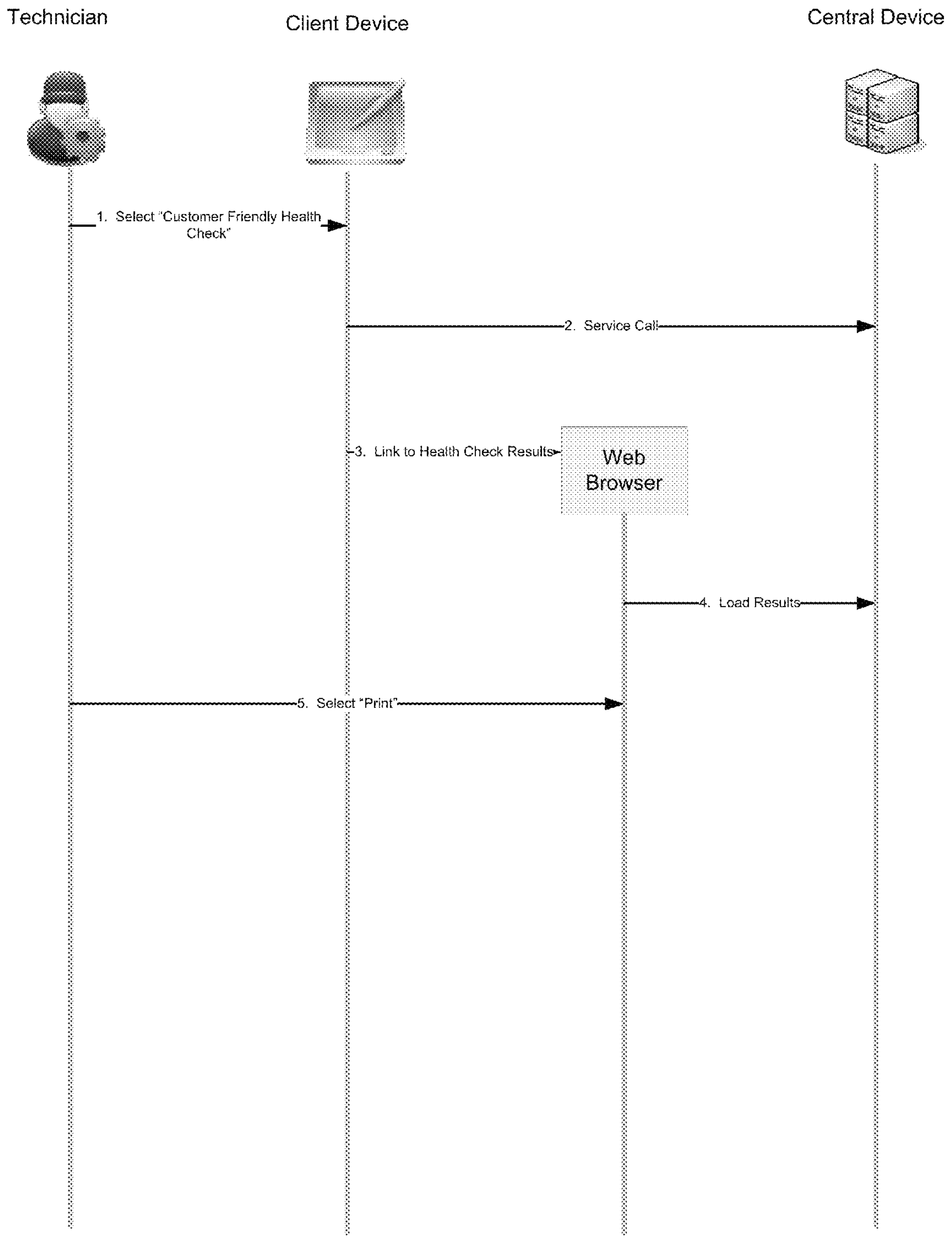
FIG. 14 illustrates a case scenario embodiment of a customer friendly health check.

FIG. 14 illustrates a case scenario of generating a printable health check report from the client device. The purpose of this case scenario is to print a health check report for the customer and assisting customer relations. This case scenario may occur after the technician has completed the service procedure on the service vehicle. In step 1, the technician selects the "Customer Friendly Health Check" option on the client device display. In step 2, the client device may make a web service call to the central device to save the customer friendly health check, and the central device transmits back to the client device the health check result id. In step 3, the client device may open a browser window with the URL containing the health check id. The browser window may be from an authenticated browser session. The client device, in step 4, may load the saved health check results and displays a health check result screen with a print option. In step 5, the technician may select the print option. A printer may configured in a wired or wireless fashion to print the health check results.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A system comprising:
- a client device comprising:
  - a connector to selectively connect to a vehicle,
  - a vehicle interface to send and receive information from the vehicle,
  - a communication system,
  - an input/output system, and
  - a processor; and
- a central device communicatively connected to the client device,
- wherein after the client device is selectively connected to the vehicle, the client device detects the connection to the vehicle, receives the vehicle's VIN from the vehicle based on detecting the connection, and transmits the vehicle's VIN and geographic information to the central device,
- wherein the client device passively captures diagnostic information from the vehicle in response to receiving instructions from the central device and transmits the diagnostic information to the central device, and
- wherein the central device transmits further instructions to the client device in response to the received diagnostic information.

2. The system of claim 1 further comprises a help source communicatively connected to the central device.

3. The system of claim 1, wherein the communication system is a wireless communication system.

4. The system of claim 1, wherein the diagnostic information includes an electronic control unit check.

5. The system of claim 1, wherein the diagnostic information includes diagnostic trouble codes.

6. The system of claim 1, wherein the further instructions include updating calibration data on the vehicle.

7. The system of claim 1, wherein the further instructions include a halt message.

8. The system of claim 1, wherein the further instructions include a market monitor message instructing the client device to collect selected data from the vehicle.

9. The system of claim 1, wherein the central devices comprises at least one database.

10. The system of claim 1, wherein the central device further instructs the client device to passively collect quality investigative data from the service vehicle and to transmit the quality investigative data to the central device.

11. The system of claim 1, wherein the diagnostic information relates to warranty claims.

12. A method, comprising:
- detecting a selective connection between a client device and a vehicle;
- based on detecting the selective connection, capturing identification information from the vehicle, wherein the identification information includes VIN;
- transmitting the captured identification information and geographic information to a central device;
- receiving configuration data from the central device, wherein the configuration data is responsive to the identification information and includes instructions;
- passively capturing diagnostic information from the vehicle in response to the instructions;
- transmitting the captured diagnostic information to the central device;
- receiving further instructions from the client device in response to the diagnostic information; and
- displaying the further instructions on a display.

13. The method of claim 12 further comprises contacting a help source that is communicatively connected to the central device.

14. The method of claim 12, wherein the diagnostic information includes an electronic control unit check.

15. The method of claim 12, wherein the diagnostic information includes diagnostic trouble codes.

16. The method of claim 12, wherein the further instructions include updating calibration data on the vehicle.

17. The method of claim 12, wherein the further instructions include a halt message.

18. The method of claim 12, wherein the further instructions include a market monitor message instructing the client device to collect selected data from the vehicle.

19. The method of claim 12, further comprising:
- passively collecting quality investigative data from the service vehicle responsive to central device quality investigation instructions;
- transmitting the quality investigative data to the central device.

20. The method of claim 12, wherein the diagnostic information relates to warranty claims.

21. A client device comprising:
- a connector to selectively connect to a vehicle;
- a vehicle interface to send and receive information from the vehicle;
- a communication system to communicate with a central device;
- an input/output system; and
- a processor,
- wherein the client device is to selectively connect to the vehicle, to detect the connection to the vehicle, to receive the vehicle's VIN from the vehicle based on the detection of the connection, and to transmit the vehicle's VIN and geographic information to the central device,
- wherein the client device is to passively capture diagnostic information from the vehicle in response to receiving instructions from the central device and to transmit the diagnostic information to the central device, and
- wherein the client device is to receive further instructions from the central device in response to the transmitted diagnostic information.

22. The client device of claim 21, wherein the communication system is a wireless communication system.

23. The client device of claim 21, wherein the diagnostic information includes an electronic control unit check.

24. The client device of claim 21, wherein the diagnostic information includes diagnostic trouble codes.

25. The client device of claim 21, wherein the further instructions include updating calibration data on the vehicle.

26. The client device of claim 21, wherein the further instructions include a halt message.

27. The client device of claim 21, wherein the further instructions include a market monitor message instructing the client device to collect selected data from the vehicle.

28. The client device of claim 21, wherein the client device is to passively collect quality investigative data from the service vehicle responsive to central device quality investigation instructions and to transmit the quality investigative data to the central device.

29. The client device of claim 21, wherein the diagnostic information relates to warranty claims.

30. The system of claim 1, wherein the further instructions initiate a multi-tier diagnostic operations where each tier includes an exchange of information between the client device and the central device.

31. The method of claim 12, wherein the further instructions initiate a multi-tier diagnostic operations where each tier includes an exchange of information between the client device and the central device.

32. The client device of claim 21, wherein the further instructions initiate a multi-tier diagnostic operations where each tier includes an exchange of information between the client device and the central device.

* * * * *